United States Patent
Sivalingam et al.

(10) Patent No.: US 10,509,694 B2
(45) Date of Patent: Dec. 17, 2019

(54) SYSTEM AND METHODS FOR OPTIMAL ERROR DETECTION IN PROGRAMMATIC ENVIRONMENTS

(71) Applicant: MICROSOFT TECHNOLOGY LICENSING, LLC, Redmond, WA (US)

(72) Inventors: Lenin Ravindranath Sivalingam, Redmond, WA (US); Sergey Kanzhelev, Redmond, WA (US); Suman Kumar Nath, Redmond, WA (US); Madan Musuvathi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 113 days.

(21) Appl. No.: 15/632,118

(22) Filed: Jun. 23, 2017

(65) Prior Publication Data

US 2018/0373581 A1    Dec. 27, 2018

(51) Int. Cl.
*G06F 11/07* (2006.01)

(52) U.S. Cl.
CPC ...... *G06F 11/0778* (2013.01); *G06F 11/0706* (2013.01); *G06F 11/0709* (2013.01); *G06F 11/079* (2013.01); *G06F 11/0751* (2013.01); *G06F 11/0781* (2013.01)

(58) Field of Classification Search
CPC ............. G06F 11/0778; G06F 11/0706; G06F 11/0751; G06F 11/079; G06F 11/0781
See application file for complete search history.

(56) References Cited

U.S. PATENT DOCUMENTS

| | | |
|---|---|---|
| 8,630,409 B2 | 1/2014 | Woodruff |
| 9,158,925 B2 | 10/2015 | Kamara |
| 2003/0131282 A1* | 7/2003 | Lowen ............... G06F 11/0715 714/20 |

(Continued)

OTHER PUBLICATIONS

Rindal, et al., "Improved Private Set Intersection against Malicious Adversaries", In Journal of IACR Cryptology ePrint Archive, 2016, pp. 1-18.

(Continued)

*Primary Examiner* — Yolanda L Wilson
(74) *Attorney, Agent, or Firm* — Newport IP, LLC; Benjamin Keim (57) ABSTRACT

System and methods are provided for optimal error detection in programmatic environments through the utilization of at least one user-defined condition. Illustratively, the conditions can include one or more triggers initiating the collection of log data for methods associated with the provided at least one condition. Operatively, the disclosed systems and methods observe the run-time of the programmatic environment and initiate the collection of log data based on the occurrence of a condition trigger. A rank score can also be calculated to rank the methods associated with the defined condition to isolate those methods that have higher probability of causing the defined condition. Dynamic instrumentation of the methods associated with the user defined conditions during run time are used to calculate the rank score, which is used for ranking the methods.

20 Claims, 7 Drawing Sheets

(56) References Cited

U.S. PATENT DOCUMENTS

| | | | | |
|---|---|---|---|---|
| 2005/0015579 | A1* | 1/2005 | Grover | G06F 11/0748 |
| | | | | 712/244 |
| 2006/0245587 | A1 | 11/2006 | Pinkas et al. | |
| 2007/0005594 | A1 | 1/2007 | Pinkas et al. | |
| 2015/0100835 | A1* | 4/2015 | Suzuki | G06F 11/0706 |
| | | | | 714/57 |
| 2015/0199254 | A1* | 7/2015 | Vesepogu | G06F 11/0709 |
| | | | | 717/130 |
| 2015/0347220 | A1* | 12/2015 | Hermany | G06F 11/0742 |
| | | | | 714/48 |
| 2017/0075749 | A1* | 3/2017 | Ambichl | G06F 11/079 |

OTHER PUBLICATIONS

Raab, et al., ""Balls into Bins"—A Simple and Tight Analysis", In Proceedings of the Second International Workshop on Randomization and Approximation Techniques in Computer Science, Oct. 8, 1998, pp. 159-170.

Smart, et al., "Fully homomorphic SIMD operations", In Journal of Designs, codes and cryptography vol. 71, Issue 1, Apr. 2014, pp. 1-19.

Bourse, et al., "FHE Circuit Privacy Almost for Free", In Proceedings of Annual Cryptology Conference, Aug. 14, 2016, 22 pages.

Brakerski, Zvika, "Fully homomorphic encryption without modulus switching from classical GapSVP", In Proceedings of the 32nd Annual Cryptology Conference on Advances in Cryptology, vol. 7417, Aug. 19, 2012, 20 pages.

Buchmann, et al., "Creating cryptographic challenges using multi-party computation: The LWE challenge", In Proceedings of the 3rd ACM International Workshop on ASIA Public-Key Cryptography, May 30, 2016, pp. 11-20.

Crandall, et al., "Prime numbers: a computational perspective", In Publication of Springer, Apr. 7, 2006, 604 pages.

Crockett, et al., "Challenges for Ring-LWE", In Journal of IACR Cryptology ePrint Archive, 2016, pp. 1-38.

Dowlin, et al., "Manual for Using Homomorphic Encryption for Bioinformatics", In TechReport of MSR-TR-2015-87, Nov. 13, 2015, pp. 1-13.

Ducas, et al., "Ring-LWE in Polynomial Rings", In Proceedings of 15th International Conference on Practice and Theory in Public Key Cryptography, May 21, 2012, 23 pages.

Goldwasser, et al., "Robustness of the learning with errors assumption", In Journal of Innovations in Computer Science, Jan. 1, 2010, pp. 230-240.

Harvey, David, "Faster arithmetic for number-theoretic transforms", In Journal of Symbolic Computation, vol. 60, Jan. 31, 2014, pp. 1-9.

Laine, et al., "Simple encrypted arithmetic library—seal (v2.0)", In Technical Report of MSR-TR-2016-52, Sep. 6, 2016, 24 pages.

Lepoint, et al., "A comparison of the homomorphic encryption schemes FV and YASHE", In Proceedings of 7th International Conference on Cryptology in Africa, May 28, 2014, 18 pages.

Longa, et al., "Speeding up the Number Theoretic Transform for Faster Ideal Lattice-Based Cryptography", In Proceedings of 15th International Conference, CANS, Nov. 14, 2016, pp. 1-18.

Lyubashevsky, et al., "A Toolkit for Ring-LWE Cryptography", In Proceedings of 32nd Annual International Conference on the Theory and Applications of Cryptographic Techniques, May 26, 2013, 19 pages.

Regev, Oded, "On lattices, learning with errors, random linear codes, and cryptography", In Proceedings of the thirty-seventh annual ACM symposium on Theory of computing, May 22, 2005, pp. 84-93.

Kerschbaum, Florian, "Outsourced Private Set Intersection Using Homomorphic Encryption", In Proceedings of the 7th ACM Symposium on Information, Computer and Communications Security, May 2, 2012, 10 pages.

Xiuguang, et al., "Two-Dimensional Private Set Intersection in Big Data", In Proceedings of International Conference on Intelligent Networking and Collaborative Systems, Sep. 2, 2015, pp. 407-410.

Cristofaro, et al., "Fast and Private Computation of Cardinality of Set Intersection and Union", In Proceedings of International Conference on Cryptology and Network Security, Dec. 12, 2012, pp. 1-18.

Armknech, et al., "A Guide to Fully Homomorphic Encryption", In Journal of IACR Cryptology ePrint Archive: Report 2015/1192, 2015, pp. 1-35.

Asharov, et al, "Multiparty computation with low communication, computation and interaction via threshold FHE", In Proceedings of the 31st Annual international conference on Theory and Applications of Cryptographic Techniques, Apr. 15, 2012, pp. 483-501.

Albrecht, Martin R., "On dual lattice attacks against small-secret LWE and parameter choices in HElib and SEAL", In Journal of Cryptology ePrint Archive: Report 2017/047, 2017, pp. 1-29.

Arbitman, et al., "Backyard cuckoo hashing: Constant worst-case operations with a succinct representation", In Proceedings of 51th Annual IEEE Symposium on Foundations of Computer Science, Oct. 23, 2010, 34 pages.

Albrecht, et al., "On the concrete hardness of learning with errors", In Journal of Mathematical Cryptology, vol. 9, Issue 3, Oct. 1, 2015, pp. 1-40.

Bradley, et al., "Bounded Size-Hiding Private Set Intersection", In Journal of Cryptology ePrint Archive: Report 2016/657, 2016, 20 pages.

Brakerski, et al., "Packed Ciphertexts in LWE-based Homomorphic Encryption", In Proceedings of 16th International Conference on Practice and Theory in Public-Key Cryptography, Feb. 26, 2013, pp. 1-12.

Brakerski, et al., "(Leveled) fully homomorphic encryption without bootstrapping", In Proceedings of the 3rd Innovations in Theoretical Computer Science Conference, Jan. 8, 2012, pp. 309-325.

Bos, et al., "Improved security for a ring-based fully homomorphic encryption scheme", In Proceedings of the 14th IMA International Conference on Cryptography and Coding—vol. 8308, Dec. 17, 2013, 30 pages.

Brakerski, et al., "Efficient Fully Homomorphic Encryption from (Standard) LWE", In SIAM Journal on Computing, vol. 43, Issue 2, Apr. 29, 2014, 43 pages.

Costache, et al., "Which Ring Based Somewhat Homomorphic Encryption Scheme is Best?", In Proceedings of Cryptographers' Track at the RSA Conference, Feb. 29, 2016, 54 pages.

Dong, et al., "When Private Set Intersection Meets Big Data: An Efficient and Scalable Protocol", In Journal of Cryptology ePrint Archive: Report 2013/515, 2013, pp. 1-29.

Dietzfelbinger, et al., "Tight thresholds for cuckoo hashing via XORSAT", In Proceedings of 37th International Colloquium Automata, Languages and Programming, Jul. 6, 2010, pp. 1-36.

Devroye, et al., "Cuckoo hashing: Further analysis", In Journal of Information Processing Letters, vol. 86, Issue 4, May 31, 2003, pp. 215-219.

Ducas, et al., "Sanitization of FHE ciphertexts", In Proceedings of Annual International Conference on the Theory and Applications of Cryptographic Techniques, May 8, 2016, 19 pages.

Dachman-Soled, et al., "Efficient robust private set intersection", In Proceedings of the 7th International Conference on Applied Cryptography and Network Security, Jun. 2, 2009, pp. 125-142.

Freedman, et al., "Efficient Set Intersection with Simulation-Based Security", In Journal of Cryptology, Sep. 4, 2014, pp. 1-35.

Frieze, et al., "An Analysis of Random-Walk Cuckoo Hashing", In Proceedings of the 12th International Workshop and 13th International Workshop on Approximation, Randomization, and Combinatorial Optimization. Algorithms and Techniques, Aug. 21, 2009, pp. 1-18.

Freedman, et al., "Efficient Private Matching and Set Intersection", In Proceedings of International conference on the theory and applications of cryptographic techniques, May 2, 2004, 18 pages.

Fotakis, et al., "Space Efficient Hash Tables with Worst Case Constant Access Time", In Proceedings of the 20th Annual Symposium on Theoretical Aspects of Computer Science, Feb. 27, 2003, 12 pages.

Fan, et al., "Somewhat Practical Fully Homomorphic Encryption", In Journal of Cryptology ePrint Archive: Report 2012/144, 2012, pp. 1-19.

(56) References Cited

OTHER PUBLICATIONS

Dowlin, et al., "CryptoNets: Applying neural networks to encrypted data with high throughput and accuracy", In Proceedings of the 33nd International Conference on Machine Learning, Jun. 19, 2016, pp. 1-10.

Gentry, Craig, "Fully homomorphic encryption using ideal lattices", In Proceedings of the forty-first annual ACM symposium on Theory of computing, vol. 9, May 31, 2009, pp. 169-178.

Gentry, et al., "Homomorphic Evaluation of the AES Circuit", In Proceedings of the 32nd Annual Cryptology Conference on Advances in Cryptology, Aug. 22, 2012, 18 pages.

Gentry, et al., "I-Hop Homomorphic Encryption and Rerandomizable Yao Circuits", In Proceedings of the 30th annual conference on Advances in cryptology, Aug. 15, 2010, 18 pages.

Gentry, et al., "Homomorphic Encryption from Learning with Errors: Conceptually-Simpler, Asymptotically-Faster, Attribute-Based", In Proceedings of Advances in Cryptology, vol. 1, Aug. 18, 2013, pp. 1-25.

Huang, et al., "Private Set Intersection: Are Garbled Circuits Better than Custom Protocols?", In Proceedings of 19th Network and Distributed Security Symposium, Feb. 5, 2012, 15 pages.

Huberman, et al., "Enhancing privacy and trust in electronic communities", In Proceedings of the 1st ACM conference on Electronic commerce, Nov. 3, 1999, 9 pages.

Hazay, et al., "Efficient Protocols for Set Intersection and Pattern Matching with Security against Malicious and Covert Adversaries", In Proceedings of the 5th conference on Theory of cryptography, Mar. 19, 2008, pp. 1-33.

Hazay, et al., "Efficient Set Operations in the Presence of Malicious Adversaries", In Proceedings of International Workshop on Public Key Cryptography, May 26, 2010, pp. 1-46.

Ishai, et al., "Extending Oblivious Transfers Efficiently", In Proceedings of Annual International Cryptology Conference, Aug. 17, 2003, pp. 145-161.

Kolesnikov, et al., "Efficient Batched Oblivious PRF with Applications to Private Set Intersection", In Journal of Cryptology ePrint Archive: Report 2016/799, Aug. 20, 2016, pp. 1-19.

Kamara, et al., "Scaling private set intersection to billion-element sets", In Proceedings of International Conference on Financial Cryptography and Data Security, Mar. 3, 2014, 14 pages.

LambÆk, Mikkel, "Breaking and Fixing Private Set Intersection Protocols", In Journal of Cryptology ePrint Archive: Report 2016/665, Jun. 2016, 71 pages.

Lopez-Alt, et al., "On-the-Fly Multiparty Computation on the Cloud via Multikey Fully Homomorphic Encryption", In Proceedings of the forty-fourth annual ACM symposium on Theory of computing, May 19, 2012, pp. 1219-1234.

Laine et al. "Simple Encrypted Arithmetic Library—SEAL v2.1", In Technical Report of MSR-TR-2016-52, Sep. 6, 2016, 27 pages.

Lindell, Yehuda, "How to Simulate It—A Tutorial on the Simulation Proof Technique", In Journal of Cryptology ePrint Archive, Report 2016/046, May 24, 2016, pp. 1-64.

Lyubashevsky, et al., "On ideal lattices and learning with errors over rings", In Proceedings of Annual International Conference on the Theory and Applications of Cryptographic Techniques, May 30, 2010, pp. 1-34.

Marlinspike, Moxie, "The Difficulty of Private Contact Discovery", https://whispersystems.org/blog/contact-discovery/, Published on: Jan. 3, 2014, 3 pages.

Meadows, Catherine, "A more efficient cryptographic matchmaking protocol for use in the absence of a continuously available third party", In Proceedings of IEEE Symposium on Security and Privacy, Apr. 7, 1986, pp. 134-137.

Lauter, et al., "Can homomorphic encryption be practical?", In Proceedings of the 3rd ACM workshop on Cloud computing security workshop, Oct. 21, 2011, pp. 113-124.

Orru, et al., "Actively Secure 1-out-of-N OT Extension with Application to Private Set Intersection", In Journal of Cryptology ePrint Archive: Report 2016/933, Nov. 2016, pp. 1-27.

Pagh, et al., "Cuckoo Hashing", In Journal of European Symposium on Algorithms, Aug. 2001, pp. 121-133.

Pinkas, et al., "Phasing: Private set intersection using permutation-based hashing", In Proceedings of the 24th USENIX Conference on Security Symposium, Aug. 12, 2015, pp. 515-530.

Pinkas, et al., "Faster private set intersection based on OT extension", In Journal of IACR Cryptology ePrint Archive, 2014, pp. 1-21.

Pinkas, et al., "Scalable private set intersection based on OT extension", In Journal of IACR Cryptology ePrint Archive, 2016, pp. 1-35.

Rivest, et al., "On data banks and privacy homomorphisms", In Proceedings of Foundations of secure computation, vol. 4, Issue 11, Oct. 16, 1978, pp. 169-180.

\* cited by examiner

SYSTEM AND METHODS FOR OPTIMAL ERROR DETECTION IN PROGRAMMATIC ENVIRONMENTS

BACKGROUND

Developers and operators working in programmatic environments (e.g., a computing and/or processing environment capable of executing one or more methods of a program, service, etc.) are constantly challenged to isolate root causes of errors that invariably occur in the execution of methods in these environments. For simple sets of methods, the challenge is less daunting, however, when hundreds, if not, thousands of methods having asynchronous dependencies on each other are executed as part of a program, service, etc., the challenge can cause substantial inefficiencies. If such errors are not easily identified during the development/operation of such methods, the reliability, usability, and performance of resultant sets of methods, when executed, can completely barricade the development of a software project.

Operatively, when software systems (e.g., as expressed as a set of methods) misbehave, developers and operators most commonly rely on various runtime logs to troubleshoot and diagnose these problems. Generating logs involves an inherent tradeoff between logging sufficient detail to locate the root cause of problems and the prohibitive runtime cost of adding detailed logs. Developers often err on the side of inclusion of a larger set of logs than may be necessary to optimally execute the methods in the programmatic environment. Moreover, having a larger set of what may be considered as unnecessary logs may result in diminished usability and/or performance of the software system.

A current practice to ameliorate the overhead caused by the implementation of excessive logging is the use of dynamic instrumentation that lets developers collect log data at target trace-points for a short period of time. However, such a practice requires the developer to specify where (e.g., at what methods) to collect log data and, moreover, to observe the misbehavior during method execution to interactively enable/disable logging.

A more advantageous approach to achieve optimal error detection in programmatic environments considers the use of automatic logging only when a programmatic execution error occurs and only for the methods whose execution causes the error. Such an approach, as expressed by the systems and methods of the current disclosure, substantially improves on current practices and reduces the challenges faced by developers and operators alike in achieving optimal error detection in programmatic environments.

It is with respect to these considerations and others that the disclosure made herein is presented.

SUMMARY

Techniques described herein provide for optimized error detection in programmatic environments. Generally described, technologies disclosed herein allow for the use of one or more defined execution conditions and one or more condition triggers by a software system that operatively results in the identification of the universe of possible methods that could be the root cause of one or more programmatic environment errors associated with the one or more defined conditions.

As used herein, a "programmatic environment" refers generally to a software system expressed as one or more executable methods. An exemplary programmatic environment can include but is not limited to a standalone computer program, a web-based computing application utilizing web services, and/or an operating system operative to execute one or more methods representative of but not limited to a program feature, function, and/or process. Further the exemplary programmatic environment can be operative to execute one or more error checking protocols inclusive of automatic drill down with dynamic instrumentation and triggers (AUDIT).

According to aspects of the present disclosure, a system is provided that allows for the definition of one or more execution conditions (e.g., run time conditions) having one or more condition triggers in a programmatic environment. In an illustrative implementation, the one or more condition triggers of the one or more execution conditions when triggered by the execution of one or methods executing in the programmatic environment initiate the collection of log data according to one or more predefined parameters of the one or more execution conditions. Illustratively, the system identifies a set of one or more methods associated with predefined one or more conditions.

In an illustrative operation, the system observes the identified one or more methods executing in the programmatic environment to determine if there are any execution errors. In the event that there are execution errors, in an illustrative implementation, a rank score can be calculated and can be assigned to each of the one or more methods to pare down the set of one or more methods to those one or more methods having a higher probability of being the root cause of one or more execution errors. This can result in a sub-set of one or more methods associated with the one or more conditions. Illustratively, the system operates to perform dynamic instrumentation of the resultant sub-set of one or more methods.

In an illustrative operation, dynamic instrumentation of methods can include the execution of the sub-set of one or more instructions and methods using one or more selected logging parameters that allow for the method to be executed in a particular fashion to collect log data for that particular method to expose the root cause error. The resultant collected log data can then be used by a participating user (e.g., developer and/or operator of a programmatic environment) to isolate those one or more methods that are the root causes of the execution error. The logging instructions and methods can be dynamically included within (or, removed from) a target method during runtime of an exemplary application executing in the programmatic environment.

In an illustrative operation, the system can calculate the rank score using one or more ranking methodologies to isolate a programmatic environment of the one or more errors. By way of illustrative example, for exception-related triggers, methods can be ranked by the system on the programmatic environment's call chain based on the proximity of the method's execution relative to the observed exception error. A call chain can be generally understood as the set of methods that synchronously or asynchronously call the method throwing an exception. In simpler terms, the method that throws the exception error is assigned the highest rank score by the system. In another illustrative example, for an error that can impact the performance of the execution of one or methods in the programmatic environment, the system can utilize exemplary one or more bottleneck and/or critical path analysis techniques to compute the rank scores of one or more of the executing methods to isolate one or more errant executions.

Illustratively, the system can operatively identify critical paths in the call tree. A call tree can be generally understood as a tree in a programmatic environment where nodes represent methods invoked due to execution of the request. Further, the root node of the call tree can identify the first method invoked by the request. The critical path can be computed recursively, starting from a root task (e.g., the first task invoked by a request-type method(s)). In an illustrative implementation, the critical path from a task can include the task itself and (recursively computed) critical paths of (1) all child non-join tasks, (2) the longest child task of each task having the type "WhenAll," and (3) the shortest child task of each task having the type "WhenAny." When the critical path is determined by the system, the system can then operatively assign to each method on the critical path a rank score that can operatively be determined based on the observed method's exclusive and fair share time on the critical path. Using the calculated and assigned rank scores, the system can operate to collect log data for the one or more methods that have a selected rank score range.

Illustratively, the system can additionally inject dynamic instrumentation into the one or more methods that can comprise instructions to the programmatic environment to collect error log data specific to the one or more methods for which dynamic instrumentation has been illustratively injected.

In an illustrative implementation, the collected error log data can then be communicated to a participating developer/operator of the programmatic environment for use in isolating the one or more methods that, in the illustrative implementations described herein, may be responsible for execution errors.

It should be appreciated that, although described in relation to a system, the above described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

The techniques disclosed herein enable developers to identify particular methods of a computer program associated with an error. The techniques disclosed herein also balance logging sufficient details to locate the root cause of problems identified and computer programs. In addition, the techniques disclosed herein improved human interaction with computing resources, which may ultimately mitigate inadvertent inputs. Techniques disclosed herein also save other resources with respect to computing power and network resources. Improved techniques related to testing methods can reduce the number of iterations during the development process and ultimately reduce the number of times the application is compiled, etc. Other technical effects other than those mentioned herein can also be realized from implementations of the technologies disclosed herein.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The following Detailed Description describes techniques for performing error detection in an exemplary programmatic environment utilizing user-defined one or more selected conditions to initiate the aggregation, storage, and/or communication of error log data. Generally described, technologies disclosed herein enable a user (e.g., developer/operator) of an exemplary programmatic environment to define one or more conditions to a cooperating error detection module operative in the exemplary computing environment.

In programmatic environments, many important errors, including infrequent ones, are transiently recurrent—i.e., when problems occur, they subsequently recur for a short period of time. For instance, performance problems related to load-imbalance can persist until the load-balancer is activated. Similarly, if there is a request failure, a client is likely to retry the request a few times. This recurrence allows the herein described systems and methods to capture logging information on high-ranked methods. As is described herein, a set of programmatic environment conditions (e.g., exception type errors, performance errors, communication errors, etc.) and associated triggers are declaratively specified by a user. These conditions can include target misbehavior conditions as well as the set of related metrics to collect. Illustratively, the systems and methods described herein can utilize lightweight always-on monitoring (i.e., monitoring for the occurrence of a trigger without generating or collecting log data) to continuously evaluate predefined trigger conditions. When a trigger fires, the herein described systems and methods can generate error log data for the programmatic environment by dynamically instrumenting (e.g., inserting parameters to) methods as well as calculate a high blame-rank for these methods. After sufficient error log data is generated, always-on monitoring can resume. Illustratively, users (e.g., developers/operators) can then inspect generated error data to "root-cause" any of the listed logged errors.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the words "exemplary" and/or "illustrative(ly)" are used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative illustrations to process one or more computing application features/operations for a computing application having user-interactive components the subject matter is not limited to these particular embodiments. Rather, the techniques described herein can be applied to any suitable type of user-interactive and/or automated computer instruction execution methods, systems, platforms, and/or apparatus.

Figure 1:
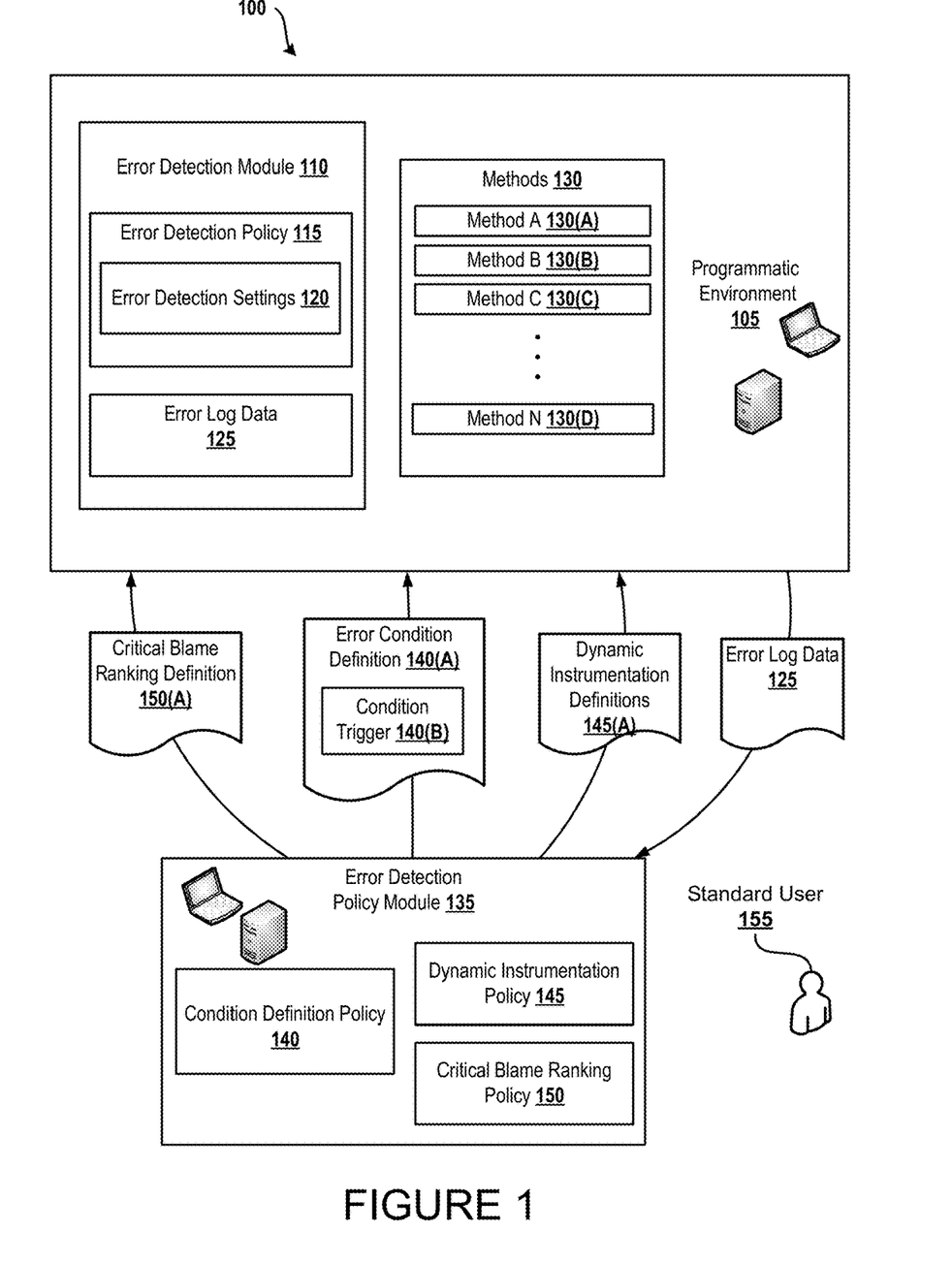
FIG. 1 illustrates an exemplary data flow scenario of a system that enables optimal error detection in a programmatic environment utilizing one or more user-defined error detection policy definitions.

Turning now to FIG. 1, an example data flow scenario is illustrated with respect to an error detection system 100 that enables error detection in an exemplary programmatic environment 105. As illustrated, programmatic environment 105 can comprise error detection module 110, and execute one or more methods 130. The error detection module 110 can include an error detection policy 115 having specified error detection settings 120 as well as generating error log data 125. The methods 130 can include one or more methods, including Method A 130(A), Method B 130(B), Method C 130(C), up to an including Method N 130(D). The methods, operatively, can be executed by the programmatic environment as part of run-time execution (e.g., computer program, web application, web service, middleware, control program, etc.). Further, as is shown, the error detection system 100 can further include an exemplary error detection policy module 135 having a condition definition policy 140, a dynamic instrumentation policy 145, and a critical blame ranking policy 150.

In an illustrative operation, error condition definition data 140(A) can be defined by a standard user 155 according to the condition definition policy 140. The error condition definition data 140(A) and associated condition trigger data 140(B) can be received by the error detection module 110 of the programmatic environment 105. The error detection module 110 can process this received data as part of the error detection policy 115 and it can be stored as the error detection settings 120. In the illustrative operation, the error detection system 100 can process the received error condition definition data 140(A) and condition the trigger data 140(B) to determine which of the method(s) 130 of the programmatic environment 105 should be monitored. Upon execution of the method(s) 130 that are associated with the received error condition definition data 140(A) and the occurrence of one or more of the condition triggers 140(B), the error log data 125 can be generated by the error detection module 110. For illustrative purposes, an "error condition" is also referred to herein as an "error tracking condition."

Operatively, the error detection system 100 can cause the error detection module 110 to further receive the dynamic instrumentation definitions data 145(A) generated according to the dynamic instrumentation policy 145 of the error detection policy module 135 as well as critical blame ranking definition data 150(A) generated according to critical blame ranking policy 150. Operatively, the dynamic instrumentation definition data 145(A) can be used by the error detection module 110 to dynamically instrument one or more of the methods 130 during run-time execution and observe the methods 130 execution behavior. Additionally, the error detection module 110 can operatively use the received critical blame ranking definition data 150(A) as well as method execution behavior to calculate rank scores for the methods 130.

By way of example, a trigger can be defined to log error data for all methods associated with a request web page condition when the latency for a requested web page from a cooperating web server exceeds a specified time period for both matched and unmatched requests. In the example, the system 100 can utilize the error condition definition data 140(A) (i.e., page request) and the associated condition trigger data 140(B) (i.e., latency exceeds a specified time period for both matched and unmatched requests) to generate the error log data 125. Operatively, in this example, the exemplary error detection system 100 can log entire call trees consisting of all synchronous and asynchronous method (e.g., methods 130) invocations causally related to the web page request being requested in the programmatic environment 105. The system 100 can also assign a blame ranking using the critical blame ranking definition data 150(A) to the methods 130, dynamically instrument the methods using the dynamic instrumentation definitions data 145(A), and generate the error log data 125 for selected one or more of the methods 130 (e.g., generate error log data for specified period of time for the top five ranked blamed methods).

It is appreciated that although, FIG. 1 shows the error detection policy module 135 to be separate from the programmatic environment 105, such illustration is merely exemplary as the systems and methods described herein contemplate the inclusion of the error detection policy module and its resident components/data within the programmatic environment 105.

Figure 2:
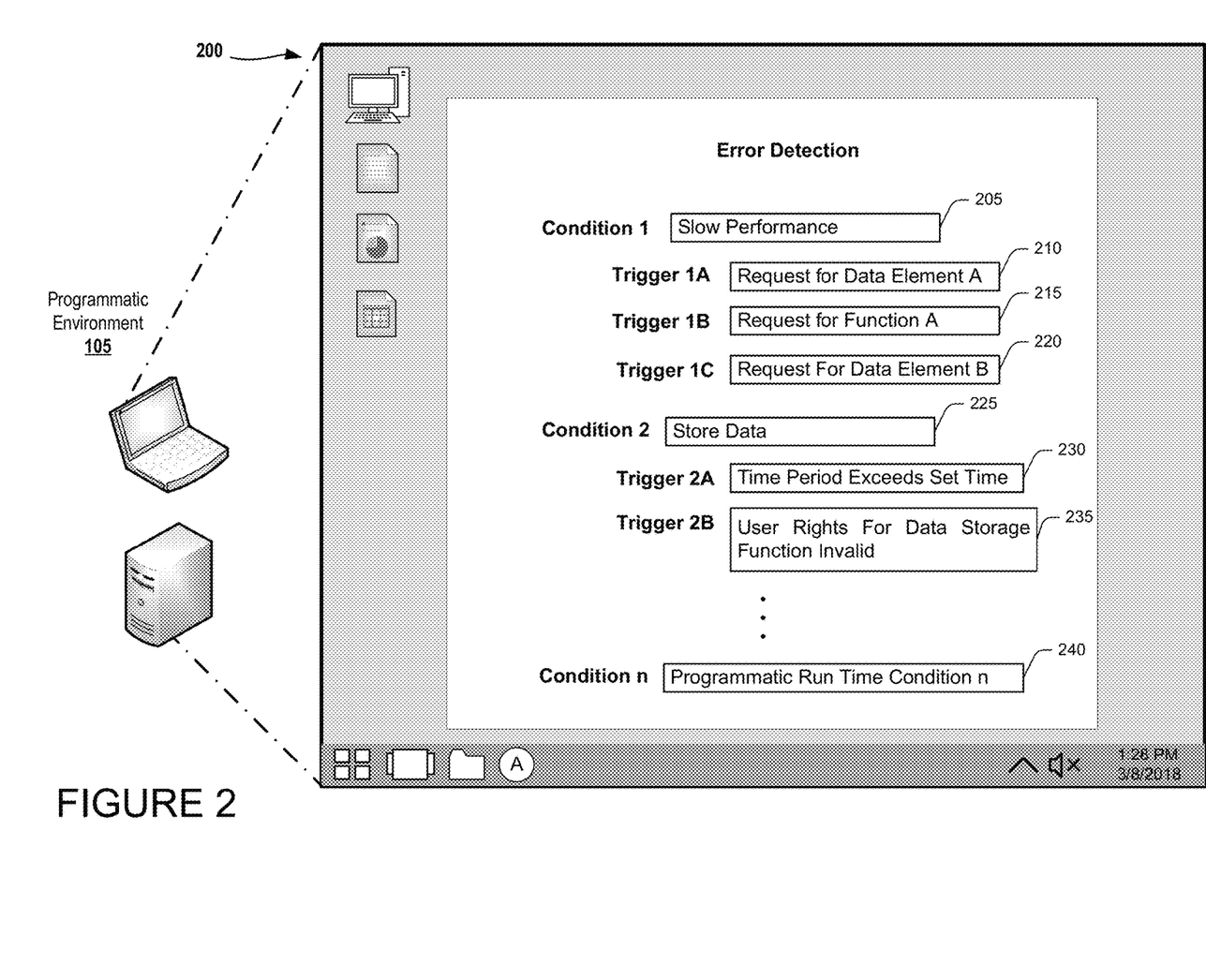
FIG. 2 illustrates various aspects of an exemplary user interface of an illustrative programmatic environment for use in defining one or more error detection policies.

Turning now to FIG. 2, illustrated here are various aspects of an exemplary user interface (UI) 200 (need this number on the figure) that can be displayed on an exemplary programmatic environment to enable the standard user 155 the ability to provide condition and trigger definitions. As is shown, exemplary UI 200 comprises one or more interactive input fields that allow the standard user 155 to input data for use in error detection. Illustratively, the standard user 155 can input condition definition data 205 and 225, as well as associated trigger condition data 210, 215, 220, 230, and 235. By way of example, condition 1 (slow performance) 205 may have three associated trigger conditions (Request for Data Element A) 210, (Request for Function A) 215, and (Request for Data Element B) 220. Condition 2, in turn, may have two trigger conditions (Time Period Exceeds Set Time) 230 and (User Rights For Data Storage Function Invalid) 235. The systems and methods described herein do not contemplate a limit on the number of conditions (e.g., up to Condition n (Programmatic Run Time Condition n) 240), or the number of trigger conditions associated with each condition.

It is to be appreciated that although UI of FIG. 2 is shown to be a windows-based UI having forms and field definitions, such description is merely illustrative, as the systems and methods described herein contemplate the use of various UIs capable of allowing the user to input data.

Figure 3:
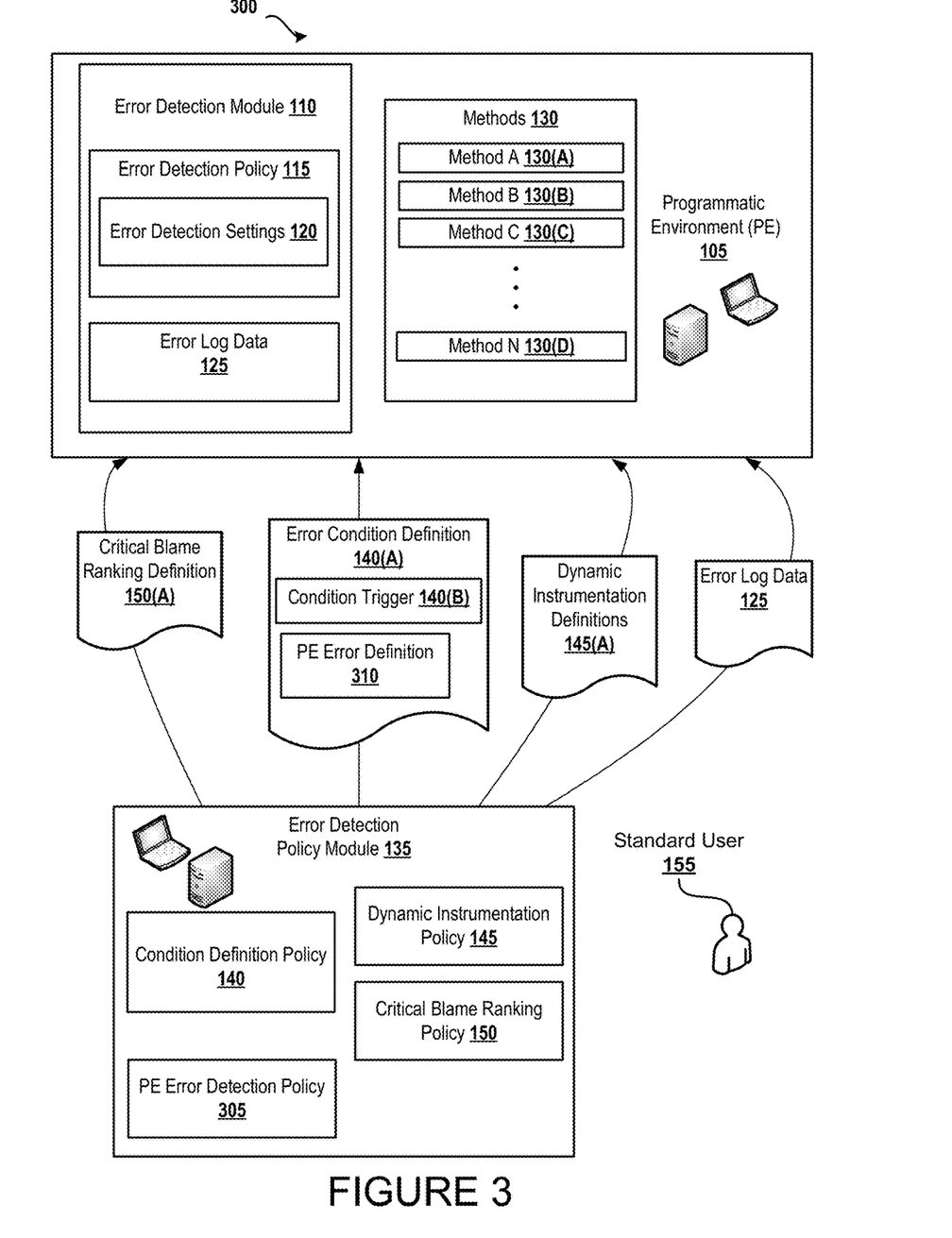
FIG. 3 illustrates an example data flow scenario of a system that enables a standard user to perform error detection in a programmatic environment using the inherent error detection definition policies of the programmatic environment in conjunction with the herein described exemplary systems and methods.

FIG. 3 illustrates an example data flow scenario of a system 300 that enables error detection in the programmatic environment 105. As illustrated, the programmatic environment 105 can comprise the error detection module 110 and execute one or more of the methods 130. The error detection module 110 can include the error detection policy 115 having specified error detection settings 120 as well as generating the error log data 125. Methods 130 can include one or more methods, Method A 130(A), Method B 130(B), Method C 130(C), up to and including Method N 130(D). The methods 130, operatively, can be executed by the programmatic environment 105 as part of run-time execution (e.g., computer program, web application, web service, middleware, control program, etc.). Further, as is shown, the error detection system 300 can further include an exemplary error detection policy module 135 having the condition definition policy 140, the dynamic instrumentation policy 145, and the critical blame ranking policy 150.

In an illustrative operation, the error condition definition data 140(A) can be defined by the standard user 155 according to the condition definition policy 140. The error condition definition data 140(A) and the associated condition trigger data 140(B) can be received by the error detection module 110 of the programmatic environment 105. The error detection module 110 can process this received data as part of the error detection policy 115 and can be stored as the error detection settings 120. In the illustrative operation, the error detection system 300 can process the received error condition definition data 140(A) and condition trigger data 140(B) to determine which of the method(s) 130 of the programmatic environment 105 should be monitored. Upon execution of the method(s) 130 that are associated with the received error condition definition data 140(A) and the occurrence of one or more of the condition triggers 140(B), the error log data 125 can be generated by the error detection module 110.

Operatively, the error detection system 300 can cause the error detection module 110 to further receive the dynamic instrumentation definitions data 145(A) generated according to the dynamic instrumentation policy 145 of the error detection policy module 135. The critical blame ranking definition data 150(A) can be generated according to the critical blame ranking policy 150, as well as generating the programmatic environment error definition data 310 according to the programmatic environment error detection policy 305. Operatively, the dynamic instrumentation definition data 145(A) can be used by the error detection module to dynamically instrument one or more of the methods 130 during run-time execution and observe the methods 130 execution behavior through the instrumentation that was dynamically injected into the methods 130 (e.g., injecting a parameter to log specific methods). Additionally, the error detection module 110 can operatively use the received critical blame ranking definition data 150(A) as well as the method execution behavior to calculate rank scores for the methods 130. Also, the error detection module 110 can operatively use the programmatic environment error definition data 310 to utilize one or more characteristics of the programmatic environment 105 (e.g., functions, calls, tracing, etc.) as part of the error checking process performed by the error detection system 300. By way of example, the error detection system 300 can utilize programmatic environment error definitions such as task asynchronous pattern (TAP) functions to return values or throw exceptions to be used or caught by calling methods 130.

It is to be appreciated that although FIG. 3 shows the error detection module 110 to be separate from the programmatic environment 105 that such illustration is merely exemplary as the systems and methods described herein contemplate the inclusion of the error detection module 110 and its resident components/data within the programmatic environment 105.

Figure 4:
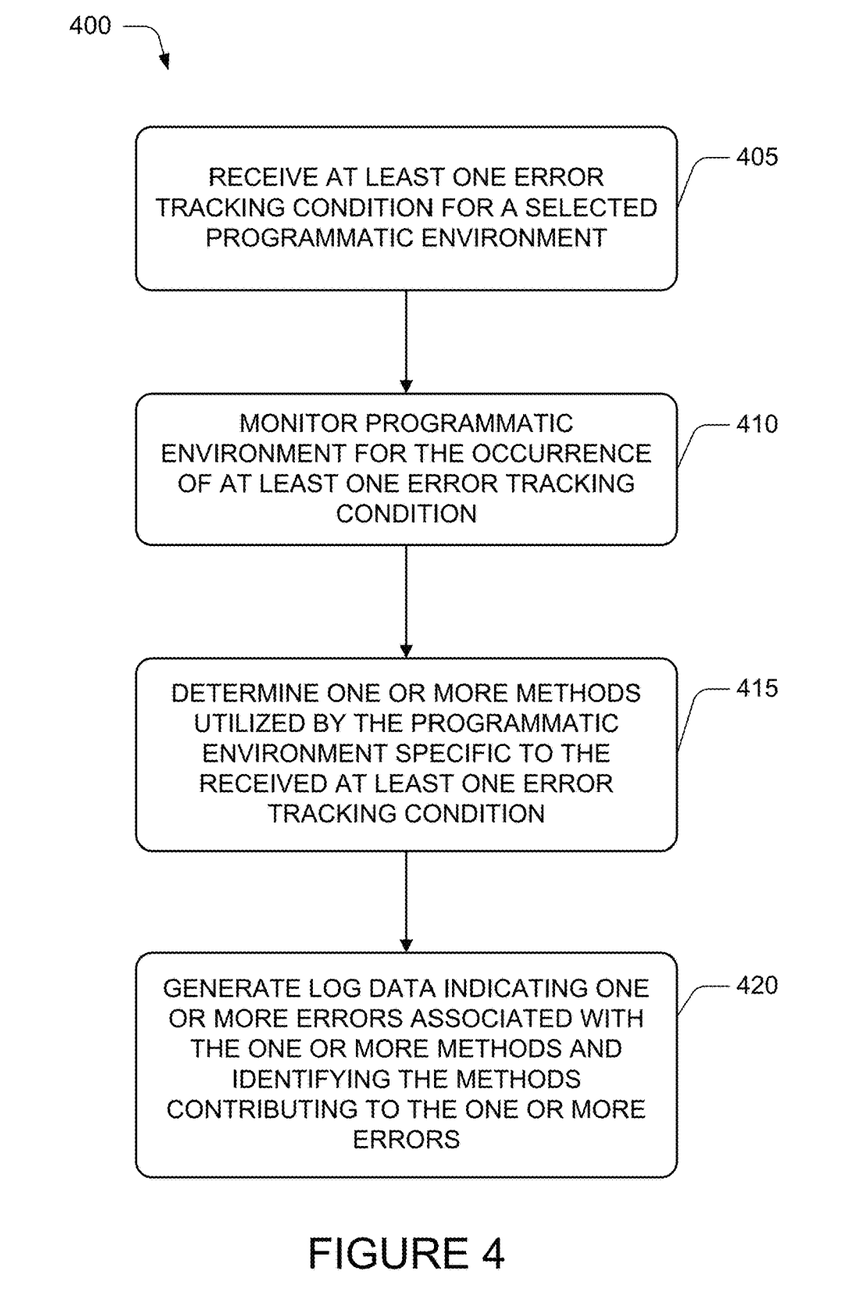
FIG. 4 is a flow diagram of an illustrative process that enables optimal error detection in a programmatic environment in accordance with the herein described systems and methods.

FIG. 4 is a flow diagram of an illustrative process 400 performed to enable error detection in an exemplary programmatic environment. Processing begins at block 405 where data representative of at least one error tracking condition is received, the data being specific to a selected programmatic environment for which error detection is being performed. Processing proceeds to block 410 where the selected programmatic environment is monitored to determine if the at least one tracking condition has occurred. Upon the occurrence of the error tracking condition, a determination is made at block 415 of the one or more methods that would be required to be executed by the selected programmatic environment for the at least one tracking condition. Processing then proceeds to block 420 where log data is generated, the generated log data including but not limited to one or more errors that result from the execution of the one or more methods being executed at block 415.

By way of illustration, the error detection method of FIG. 4 can be performed to identify one or more errors for the selected programmatic environment according to the following example. For the purposes of this example, user-defined conditions and associated triggers can be received to define misbehaving requests and to specify what data to log. By way of example, in a programmatic environment that requests data from a cooperating web server, the request could be considered as misbehaving if the request introduces latency beyond a specified time period for accessing the desired web page data. In this illustration, trigger conditions can be defined in terms of request and exception properties and these properties can be tracked.

The received trigger data can illustratively include "Event-Condition-Action" rules. Illustratively, an event-condition-action rule can be considered the method underlying event-driven computing, in which actions are triggered by events, given the existence of specific conditions. At a high level, an exemplary trigger can consist of four exemplary components: (1) ON. It specifies an event (Request-Start, RequestEnd, or Exception) at which the trigger is evaluated. (2) IF. It describes a logical condition that is evaluated on the ON event. The condition consists of several useful properties of the request r or the exception e: r:Latency, e:Name, r:ResponseString, r:URL, etc. It also can support a number of streaming aggregates: r:AvgLatency (now;−1 min) can describe the average latency of request r in the last 1 min, e:Count(now;−2 min) can describe the number of exception e's in the last 2 mins, etc. (3) LOG. It can describe what to log when the IF condition is satisfied.

Illustratively, process 400 can also operatively support logging functions of the selected programmatic environment such as "callTree" and associated methods of a request. In this illustration, the callTree function when called provides the execution paths for a particular execution of one or more methods. The key component of LOG can be an exemplary function ToLog, which when executed can indicate the exemplary target metrics of the selected programmatic environment to log: e.g., args, retValue, latency, memoryDump. Illustratively, generated error logs can be generated for requests matching (or not matching) the IF condition with a selected exemplary sampling probability. Operatively, in using an illustrative sampling probability, a comparison of logs can be performed to determine "good" from "bad" requests.

Figure 5:
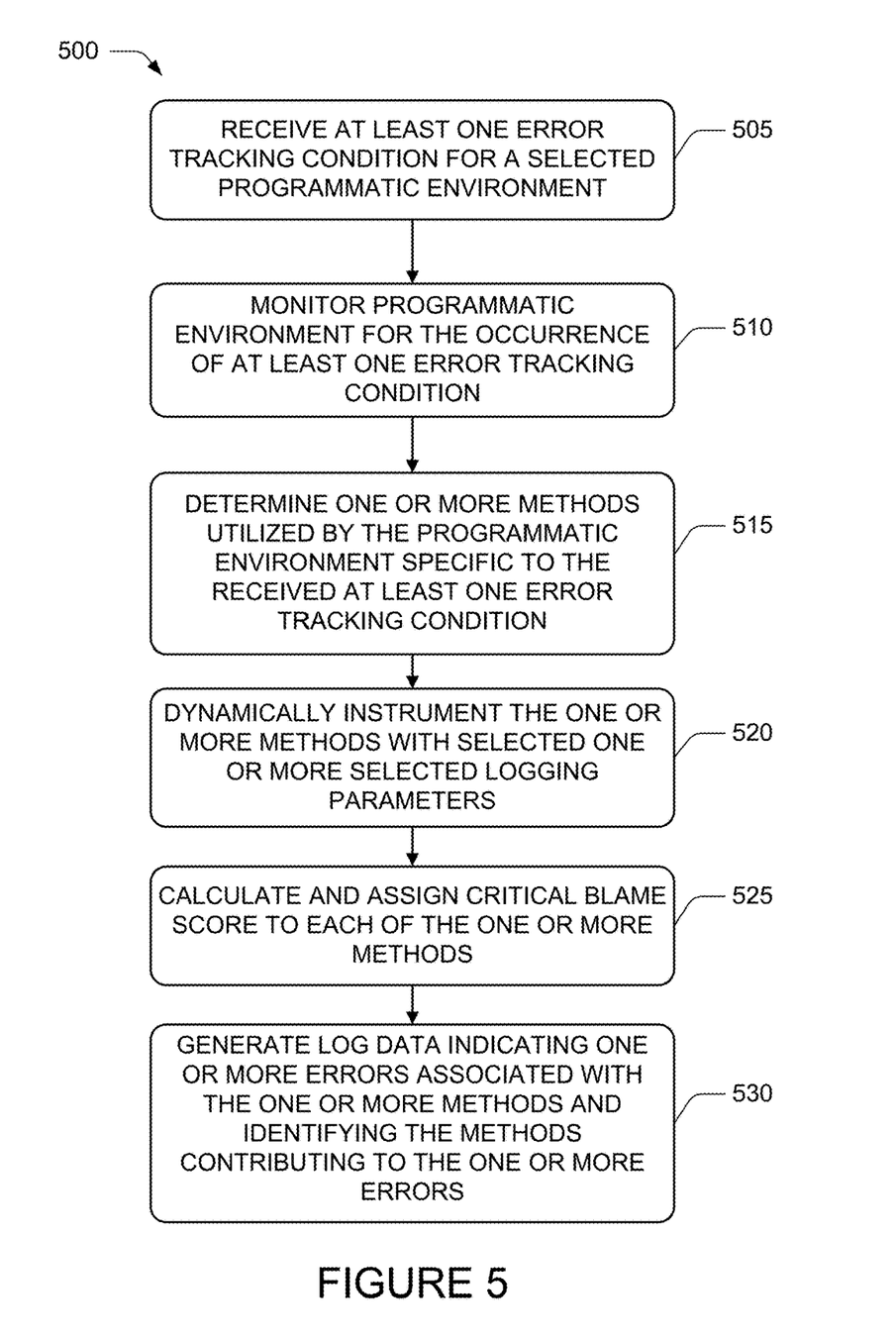
FIG. 5 is a flow diagram of an illustrative process to enables optimal error detection in a programmatic environment in accordance with other aspects of the herein described systems and methods.

FIG. 5 is a flow diagram of an illustrative process 500 to enable error detection in a selected programmatic environment. As is shown, processing begins at block 505 where data representative of at least one error tracking condition for the selected programmatic environment is received. Processing then proceeds to block 510 where the programmatic environment is monitored for the occurrence of the at least one error tracking condition. The one or more methods executed by the programmatic environment associated with the at least one error tracking condition are determined at block 515. The methods determined at block 515 can then be dynamically instrumented at block 520 to, illustratively, insert one or more selected logging parameters into the methods identified at block 515. The one or more logging parameters can be operatively used to expose the behavior of the methods during execution. Additionally, a rank score can be calculated at block 525 that can indicate a ranking of the methods of block 515 and/or the dynamically instrumented methods of block 520. The methods are executed by the programmatic environment and log data can be generated at block 530 including one or more errors associated with the one or more methods of block 515 or 520.

By way of illustration, the error detection method of FIG. 5 can be performed to identify one or more errors for the selected programmatic environment according to the following description. Illustratively, the monitoring functions of block 510 can operatively track the causal relationship of synchronous and asynchronous methods of block 515 or 520 in terms of their caller-callee relationships and can operatively represent the causality with a call tree and a call chain. Illustratively, a call tree of a request is a tree where nodes represent methods invoked due to execution of the request.

Further, in this example, a root node of a call tree can represent the first method invoked by the request.

Operatively, the processing of block 525 can identify critical paths in the call tree. A critical path can be computed recursively, starting from the root task (the first task invoked by the request). An exemplary critical path from a root task can include the task itself and (recursively computed) critical paths of (1) all child non-join tasks, (2) the longest child task of each selected parameter task (e.g., WhenAll), and (3) the shortest child task of another parameter task (e.g., WhenAny). Each method (e.g., methods of block 515 or 520) in the critical path can have a property that if it runs faster, total request latency goes down.

As part of the processing of block 525, each method on the critical path can be assigned a rank score. Illustratively, critical blame for a method consists of its exclusive and fair share of time on the critical path. To illustratively compute critical blames of dynamically instrumented methods of block 520, such methods can be linearly scanned in increasing order. Conceptually, this partitions the total request latency into a number of discrete latency segments, where each segment is bounded by one or more method execution parameters. Illustratively, the processing of block 525 combines critical path with blame scores by assigning all methods that are not in the critical path a blame of zero. Further, the error log generating processing of block 530 can operatively prioritize generated error log data for methods on the critical path according to how much they are responsible for poor performance.

Figure 6:
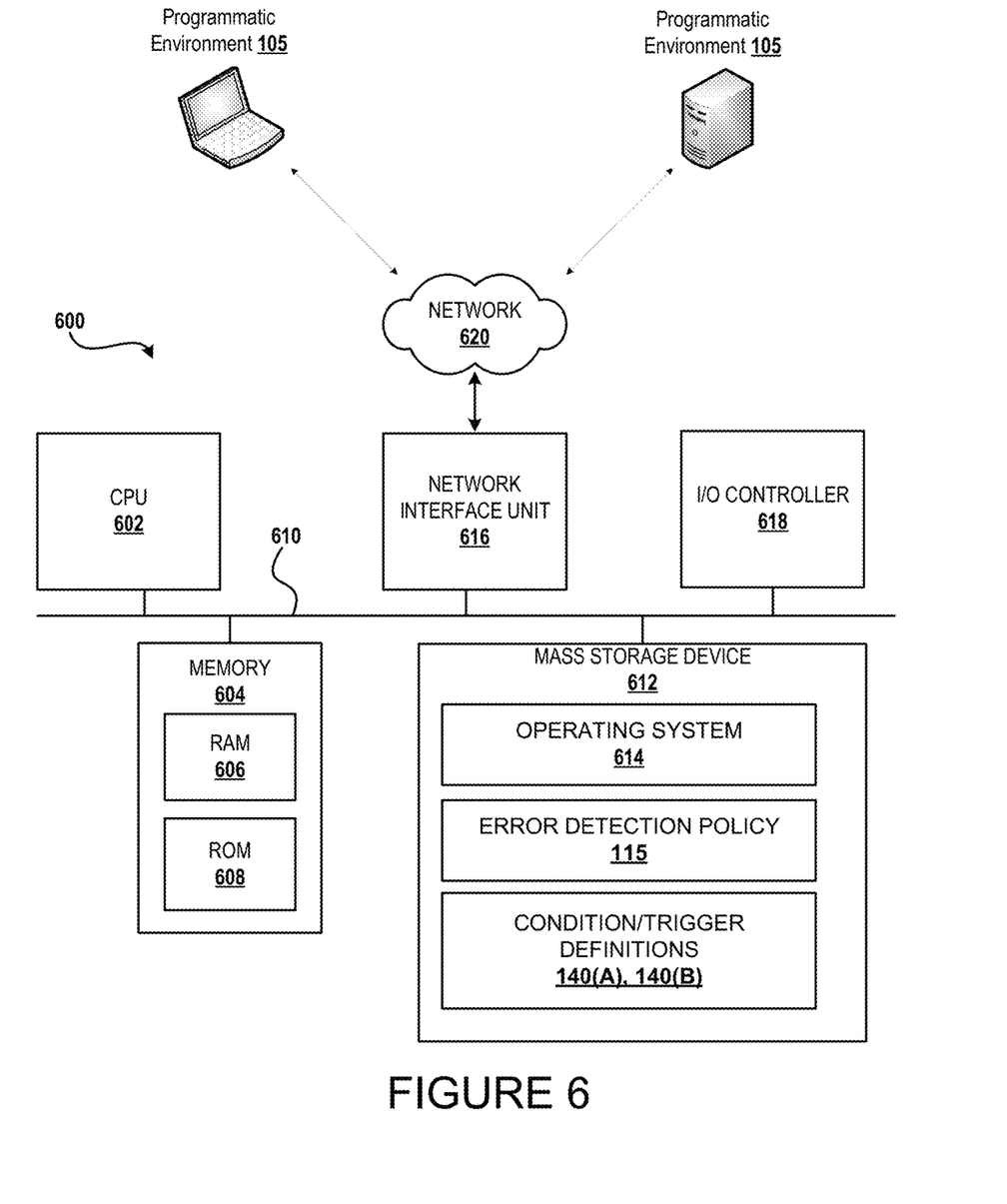
FIG. 6 shows details of an exemplary computer architecture for executing the optimal error detection in accordance with the herein described systems and methods.

The computer architecture 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 614, other data, and one or more application programs. The mass storage device 612 may further include one or more of the error detection policy 115 and/or condition definition data 140(A) and/or condition trigger data 140(B).

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid-state drive, a hard disk DVD drive or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various techniques, the computer architecture 600 may operate in a networked environment using logical connections to remote computers through a network 620 and/or another network (not shown). The computer architecture 600 may connect to the network 620 through a network interface unit 616 connected to the bus 610. It should be appreciated that the network interface unit 616 also may be utilized to connect to other types of networks and remote computer systems. The computer architecture 600 also may include an input/output controller 618 for receiving and processing input from a number of other devices, including a keyboard, mouse, or electronic stylus (not shown in FIG. 6). Similarly, the input/output controller 618 may provide output to a display screen, a printer, or other type of output device (also not shown in FIG. 6). It should also be appreciated that via a connection to the network 620 through a network interface unit 616, the computing architecture may enable the execution of the error detection policy 115 that may utilize condition definitions 140(A) and/or condition trigger data 140(B).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

Furthermore, the computer architecture 600 further comprises programmatic environment 105 that allows participating users (not shown) to interface with computer architecture 600. Although the programmatic environment 105 is shown in FIG. 6 to cooperate with the components of computer architecture 600 through network 620, such description is merely illustrative, as one skilled in the art would appreciate that programmatic environment 105 as described herein could be a part of computer architecture 600 illustratively residing as a portion of the operating system 614 or some other instruction set residing on the mass storage device 612. Furthermore, the herein described systems and methods also contemplate that the programmatic environment 105 can comprise the entirety of the computer architecture 600.

Illustrative Computer Network Environment

Computing architecture 600, described above, can be deployed as part of a computer network. In general, the above description for computing environments applies to both server computers and client computers deployed in a network environment.

Figure 7:
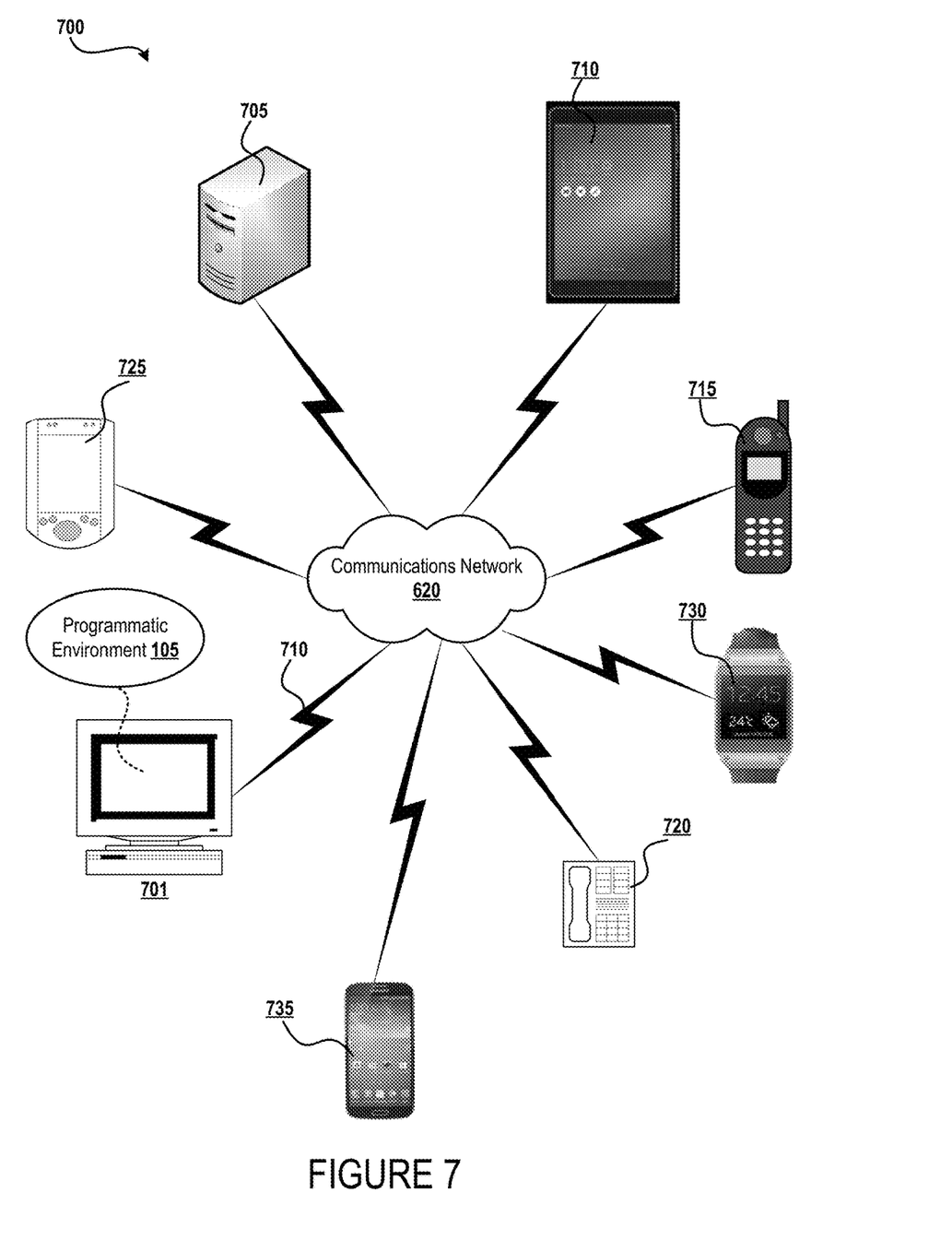
FIG. 7 shows additional details of exemplary computing devices of an exemplary computer architecture for executing the optimal error detection in accordance with the herein described systems and methods.

FIG. 7 illustrates an exemplary illustrative networked computing environment 700, with a server in communication with client computers via a communications network, in which the herein described apparatus and methods may be employed. As shown in FIG. 7, server(s) 705 may be interconnected via a communications network 620 (which may be either of, or a combination of a fixed-wire or wireless Local Area Network (LAN), Wide Area Network (WAN), intranet, extranet, peer-to-peer network, virtual private network, the Internet, Bluetooth communications network, proprietary low voltage communications network, or other communications network) with a number of client computing environments such as a tablet personal computer 710, a mobile telephone 715, a telephone 720, a personal computer(s) 701, a personal digital assistant 725, a smart phone watch/personal goal tracker (e.g., Apple® Watch, Samsung®, FitBit®, etc.) 730, and a smart phone 735. In a network environment in which the communications network 620 is the Internet, for example, server(s) 705 can be dedicated computing environment servers operable to process and communicate data to and from client computing environments 701, 710, 715, 720, 725, 730, and 735 via any of a number of known protocols, such as, hypertext transfer protocol (HTTP), file transfer protocol (FTP), simple object access protocol (SOAP), or wireless application protocol (WAP). Additionally, the networked computing environment 700 can utilize various data security protocols such as secured socket layer (SSL) or pretty good privacy (PGP). Each client computing environments 701, 710, 715, 720, 725, 730, and 735 can be equipped with programmatic environment 105 operable to support one or more computing applications or terminal sessions such as a web browser (not shown), or other graphical user interface (not shown), or a mobile desktop environment (not shown) to gain access to the server computing environment(s) 705.

Server(s) 705 may be communicatively coupled to other computing environments (not shown) and receive data regarding the participating user's interactions/resource network. In an illustrative operation, a user (not shown) may interact with a computing application running on a client computing environment(s) to obtain desired data and/or computing applications. The data and/or computing applications may be stored on server computing environment(s) 705 and communicated to cooperating users through client computing environments 701, 710, 715, 720, 725, 730, and 735, over an exemplary communications network 620. A participating user (not shown) may request access to specific data and applications housed in whole or in part on server computing environment(s) 705. These data may be communicated between client computing environments 701, 710, 715, 720, 725, 730, 735 and server computing environment(s) 705 for processing and storage. Server computing environment(s) 705 may host computing applications, processes, and applets for the generation, authentication, encryption, and communication data and applications and may cooperate with other server computing environments (not shown), third party service providers (not shown), network attached storage (NAS) and storage area networks (SAN) to realize application/data transactions.

EXAMPLE CLAUSES

The disclosure presented herein may be considered in view of the following clauses.

Example Clause A, a system for error detection in a programmatic environment, the system comprising: at least one processor; and at least one memory in communication with the at least one processor, the at least one memory having computer-readable instructions stored thereupon that, when executed by the at least one processor, cause the at least one processor to: receive data representative of at least one error condition) for a selected programmatic environment; monitor the programmatic environment for the occurrence of the at least one error condition; determine one or more methods utilized by the programmatic environment specific to the received at least one condition; and generate log data comprising data representative of one or more observed errors associated with the one or more methods, the log data identifying the one or more methods.

Example Clause B, the system of Example Clause A, wherein the computer-readable instructions further cause the at least one processor to receive data representative of one or more triggers for the at least one error condition.

Example Clause C, the system of any one of Example Clauses A through B, wherein the computer-readable instructions further cause the at least one processor to generate the log data upon the occurrence of the one or more triggers of the at least one error condition.

Example Clause D, the system of Example Clause A, wherein the computer-readable instructions further cause the at least one processor to execute the one or more methods to generate log data representative of the execution of the one or more of the methods during run-time execution.

Example Clause E, the system of Example Clause D, wherein the computer-readable instructions further cause the at least one processor to calculate a rank score for the executed one or more methods, the rank score comprising data representative of one or more runtime characteristics of the programmatic environment.

Example Clause F, the system of any one of Example Clauses D through E, wherein the computer-readable instructions further cause the at least one processor to execute the one or more methods using one or more selected parameters, wherein the selected parameters comprise at least one instruction to generate log data for the one or more methods being executed.

Example Clause G, the system of any one of Example Clauses D through F, wherein the computer-readable instructions further cause the at least one processor to generate log data for the selected one or more methods having a selected rank score, the generated log data having data representative of the execution results of the executed one or more methods.

Example Clause H, a computer-implemented method, comprising: receiving data representative of at least one error condition for a selected programmatic environment; monitoring the programmatic environment for the occurrence of the at least one error condition; determining one or more methods utilized by the programmatic environment specific to the received at least one condition; and generating log data comprising data representative of any errors associated with the one or more methods, the log data identifying the one or more methods.

Example Clause I, the computer-implemented method of Example Clause H, further comprising: receiving data comprising one or more triggers for the at least one error condition, the triggers comprising data representative of one or more parameters associated with the determined one or more methods, the parameters operative to comprise one or more error logging characteristics for the determined one or more methods.

Example Clause J, the computer-implemented method of any one of Example Clauses H through I, further comprising: collecting data representative of the execution of the determined one or more methods; selecting one or more method execution parameters associated with the collected data; and executing the determined one or more methods according to the selected one or more method execution parameters.

Example Clause K, the computer-implemented method of any one of Example Clauses H through J, the computer-implemented method of claim 8, further comprising: calculating a ranking score for the one or more determined methods, the ranking score calculated based on the collected data representative of the execution of the determined one or more methods.

Example Clause L, the computer-implemented method of any one of Example Clauses H through K, further comprising: generating error log data for selected ones of the determined one or more methods based on the calculated ranking score.

Example Clause M, the computer-implemented method of Example Clause H, further comprising: determining the type of error for which to generate log data from the received one or more condition data.

Example Clause N, the computer-implemented method of Example Clause M, further comprising constructing a runtime call chain of the programmatic environment for exception type errors, the constructed call chain comprising data representative of the associations of one or more calls between one or more of the determined methods.

Example Clause O, the computer-implemented method of any one of Example Clauses M through N, further comprising: analyzing the calls of the call chain to identify when the exception type error occurs.

While Example Clauses H through O are described above with respect to a method, it is understood in the context of this document that the subject matter of Example Clauses H through O can also be implemented by a device, by a system, and/or via computer-readable storage media.

Example Clause P, a computer-readable storage medium having computer-executable instructions stored thereupon which, when executed by one or more processors of a programmatic environment, cause the one or more processors of the programmatic environment to: receive data representative of at least one error condition for a selected programmatic environment; monitor the programmatic environment for the occurrence of the at least one error condition; determine one or more methods utilized by the programmatic environment specific to the received at least one condition; and generate log data comprising data representative of one or more observed errors associated with the one or more methods, the log data identifying the one or more methods.

Example Clause Q, the computer-readable storage medium of Example Clause P, wherein the instructions further cause the one or more processors of the programmatic environment to: collect data representative of the execution of the determined one or more methods; select one or more method execution parameters associated with the collected data; and execute the determined one or more methods according to the selected one or more method execution parameters.

Example Clause R, the computer-readable storage medium of any of Example Clauses P through Q, wherein the instructions further cause the one or more processors of the programmatic environment to: calculate a ranking score for the one or more determined methods, the ranking score being calculated based on the collected data representative of the execution of the determined one or more methods and generate error log data for the selected of the determined one or more methods base on the calculated ranking score.

Example Clause S, the computer-readable storage medium of Example Clause P, wherein the instructions further cause the one or more processors of the programmatic environment: to communicate the generated error log data to one or more cooperating computing environments.

Example Clause T, the computer-readable storage medium of Example Clause P, wherein the instructions further cause the one or more processors of the programmatic environment: to cooperate with an error detection module capable of executing data in accordance with an error detection policy having error detection settings to generate error log data, the error detection settings comprising data received from a cooperating error detection policy module comprising data representative of error condition definition data, error condition trigger definition data, dynamic instrumentation definition data, critical blame definition data, and programmatic environment error definition data.

CONCLUSION

Although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A system for error detection in a programmatic environment, comprising:
   at least one processor; and
   at least one memory in communication with the at least one processor, the at least one memory having computer-readable instructions stored thereupon that, when executed by the at least one processor, cause the at least one processor to:
   receive data representative of at least one error condition for the programmatic environment;
   determine one or more methods utilized by the programmatic environment specific to the received at least one error condition;
   receive data representative of one or more triggers for the at least one error condition, the triggers comprising data representative of one or more parameters associated with the one or more methods, the parameters operative to comprise one or more error logging characteristics for the one or more methods;
   monitor the programmatic environment for occurrence of the at least one error condition;
   generate error log data comprising data representative of one or more observed errors associated with the one or more methods upon the occurrence of the one or more triggers of the at least one error condition, the error log data identifying the one or more methods.

2. The system of claim 1, wherein the computer-readable instructions further cause the at least one processor to execute the one or more methods to generate error log data representative of the execution of the one or more methods during run-time execution.

3. The system of claim 2, wherein the computer-readable instructions further cause the at least one processor to calculate a rank score for the one or more methods, the rank score comprising data representative of one or more runtime characteristics of the programmatic environment.

4. The system of claim 3, wherein the rank score indicates a probability of the one or more methods as being the root cause of the at least one error condition.

5. The system of claim 3, wherein the computer-readable instructions further cause the at least one processor to execute the one or more methods using the one or more parameters, wherein the one or more parameters comprise at least one instruction to generate the error log data for the one or more methods being executed.

6. The system of claim 5, wherein the computer-readable instructions further cause the at least one processor to generate the error log data for the executed one or more methods having a rank score, the generated error log data having data representative of execution results of the executed one or more methods.

7. A computer-implemented method, comprising:
receiving data representative of at least one error condition for a programmatic environment;
monitoring the programmatic environment for occurrence of the at least one error condition;
determining one or more methods utilized by the programmatic environment specific to the at least one error condition;
receiving data comprising one or more triggers for the at least one error condition, the triggers comprising data representative of one or more parameters associated with the one or more methods, the parameters operative to comprise one or more error logging characteristics for the one or more methods; and
generating error log data comprising data representative of any errors associated with the one or more methods upon the occurrence of the one or more triggers of the at least one error condition, the error log data identifying the one or more methods.

8. The computer-implemented method of claim 7, further comprising:
collecting data representative of execution of the one or more methods;
selecting one or more method execution parameters associated with the collected data; and
executing the one or more methods according to the selected one or more method execution parameters.

9. The computer-implemented method of claim 8, further comprising calculating a rank score for the one or more methods, the rank score calculated based on the collected data representative of the execution of the one or more methods.

10. The computer-implemented method of claim 9, wherein the rank score indicates a probability of the one or more methods as being the root cause of the at least one error condition.

11. The computer-implemented method of claim 9, further comprising generating the error log data for selected ones of the one or more methods based on the rank score.

12. The computer-implemented method of claim 7, further comprising determining a type of error for which to generate the error log data from the at least one error condition.

13. The computer-implemented method of claim 12, further comprising constructing a run-time call chain of the programmatic environment for exception type errors, the constructed run-time call chain comprising data representative of the associations of one or more calls between the one or more methods.

14. The computer-implemented method of claim 13, further comprising analyzing the one or more calls of the run-time call chain to identify when an exception type error occurs.

15. A computer-readable storage medium having computer-executable instructions stored thereupon which, when executed by one or more processors of a programmatic environment, cause one or more processors of the programmatic environment to:
receive data representative of at least one error condition for the programmatic environment;
determine one or more methods utilized by the programmatic environment specific to the received at least one error condition;
receive data representative of one or more triggers for the at least one error condition, the triggers comprising data representative of one or more parameters associated with the one or more methods, the parameters operative to comprise one or more error logging characteristics for the one or more methods;
monitor the programmatic environment for occurrence of the at least one error condition;
generate error log data comprising data representative of one or more observed errors associated with the one or more methods upon the occurrence of the one or more triggers of the at least one error condition, the error log data identifying the one or more methods.

16. The computer-readable storage medium of claim 15, wherein the instructions further cause the one or more processors of the programmatic environment to:
collect data representative of the execution of the one or more methods;
select one or more method execution parameters associated with the collected data; and
execute the one or more methods according to the selected one or more method execution parameters.

17. The computer-readable storage medium of claim 16, wherein the executed instructions further cause the one or more processors of the programmatic environment to:
calculate a rank score for the one or more methods, the rank score being calculated based on the collected data representative of the execution of the one or more methods, wherein the rank score indicates a probability of the one or more methods as being the root cause of the at least one error condition; and
generate the error log data for the selected one of the one or more methods based on the calculated rank score.

18. The computer-readable storage medium of claim 15, wherein the instructions further cause the one or more processors of the programmatic environment to communicate the error log data to one or more cooperating computing environments.

19. The computer-readable storage medium of claim 15, wherein the instructions further cause the one or more processors of the programmatic environment to cooperate with an error detection module capable of executing data in accordance with an error detection policy having error detection settings to generate the error log data, the error detection settings comprising data received from a cooperating error detection policy module comprising data representative of error condition definition data, error condition trigger definition data, dynamic instrumentation definition data, critical blame definition data, and programmatic environment error definition data.

20. The computer-readable storage medium of claim 15, wherein the one or more triggers comprise request properties and exception properties.

* * * * *